United States Patent
Takats

(10) Patent No.: US 7,111,241 B2
(45) Date of Patent: Sep. 19, 2006

(54) METHOD FOR THE VISUAL DISPLAY OF STATES OF NETWORK ELEMENTS OF A NETWORK TO BE MONITORED, AND ALSO A MONITORING DEVICE AND PROGRAM MODULE THEREFOR

(75) Inventor: Martin Takats, Berlin (DE)

(73) Assignee: Alcatel, Paris (FR)

( * ) Notice: Subject to any disclaimer, the term of this patent is extended or adjusted under 35 U.S.C. 154(b) by 592 days.

(21) Appl. No.: 10/200,501

(22) Filed: Jul. 23, 2002

(65) Prior Publication Data

US 2003/0046386 A1    Mar. 6, 2003

(30) Foreign Application Priority Data

Jul. 30, 2001   (EP)   ............................ 01440243

(51) Int. Cl.
*G06F 3/00* (2006.01)
*G06F 3/14* (2006.01)
*H04L 12/24* (2006.01)

(52) U.S. Cl. .................. 715/736; 715/733; 715/835; 709/224; 719/315; 719/318

(58) Field of Classification Search ................ 715/733, 715/734, 736, 764, 781, 808, 809, 835, 846, 715/853; 709/223, 224; 719/313, 315, 316, 719/318

See application file for complete search history.

(56) References Cited

U.S. PATENT DOCUMENTS

| 6,112,015 | A | 8/2000 | Planas et al. |
| 6,664,978 | B1 * | 12/2003 | Kekic et al. ................ 715/733 |
| 2002/0046299 | A1 * | 4/2002 | Lefeber et al. ............. 709/318 |
| 2003/0037177 | A1 * | 2/2003 | Sutton et al. ............... 709/316 |
| 2004/0085345 | A1 * | 5/2004 | Galou et al. ................ 345/734 |

OTHER PUBLICATIONS

International Telecommunications Unit (ITU) "Information Technology—Open System Interconnection—System Management" Alarm Reporting Funtion ITU Directive X.733, pp. 1-18, 1992.

* cited by examiner

*Primary Examiner*—Lucila X. Bautista
(74) *Attorney, Agent, or Firm*—Sughrue Mion, PLLC

(57) ABSTRACT

A method is provided for the visual display of states of network elements of a network to be monitored in a monitoring device, the incoming notifications of a network element being evaluated and, therefrom, the network element being allocated a current state from a population of possible states, the number of uncleared notifications or uncleared notifications having certain criteria of a network element being determined at respective certain time intervals and a current state trend being determined therefrom, all the network elements or selected network elements being displayed as pictorial objects on a display screen and each pictorial object displaying at least the actual state and the state trend of the relevant network element, and also a monitoring device and a program module therefor.

7 Claims, 1 Drawing Sheet

METHOD FOR THE VISUAL DISPLAY OF STATES OF NETWORK ELEMENTS OF A NETWORK TO BE MONITORED, AND ALSO A MONITORING DEVICE AND PROGRAM MODULE THEREFOR

BACKGROUND OF THE INVENTION

The invention is based on a priority application EP 01 440 243.2 which is hereby incorporated by reference.

The invention relates to a method for the visual display of states of network elements of a network to be monitored in a monitoring device and a monitoring device and program module therefor.

To monitor and control a communications network with a multiplicity of network elements, central monitoring methods are used that have standardized notifications. An essential part of said monitoring method relates to the alarm management. Alarm management includes the collection of alarm notifications from objects of the monitored network or subnetwork, the determination of alarm states and the visual display of notifications and alarm states. The alarm notifications are standardized by the International Telecommunications Unit (ITU) as recommendation X.733 entitled "Information Technology—Open System Interconnection—System Management: Alarm Reporting Function", referred to below as ITU Directive X.733 for short. In this connection, in particular, alarm types, alarm causes, alarm severity levels or urgency ratings and various alarm displays, for example, a trend indication and threshold information are defined. For the trend indication, whether the urgency of a currently determined alarm is greater than, equal to or less than the urgency of all alarms hitherto determined (and still current) is determined.

Depending on the size of said network, a communications network is monitored from one or more central monitoring points. Efficient monitoring with the least possible need for personnel requires the concentration of the monitoring device at as few monitoring points as possible. This means that a monitoring point is responsible for monitoring a multiplicity of network devices, for example, for more than 50 switching points. The performance of a monitoring point depends to a large extent on the user interface, i.e. the visual display of alarm notifications and alarm states and the trend indication of alarm states.

A substantial problem in the visual display of monitoring devices in current communications networks, for example the so-called "switch management centers" for network operators, is that the information relating to alarm notifications and alarm states is not processed optimally. Even in the normal case, i.e. without the pressure of exceptional events or states, an operator has frequently to change between various display screen windows in order to obtain the necessary information relating to the monitoring of the network or of a subnetwork. Thus, for the purpose of overview, for example, a window is offered having a network map in which the individual network elements of the communications network to be monitored are displayed with their mutual relationships. The network elements are displayed as pictorial objects that contain, for example, a name, a symbol, for example a symbol for a switching center, a numerical display of alarms received and still pending and may assume a defined color depending on current urgency. The relationships of the network elements among one another are displayed by means of connecting lines. Because of the complex interweaving of relationships, only a very limited number of network elements can be displayed in a display screen window. In order to be able to display each of said network elements when necessary, the network is divided up into a plurality of subnetworks or submaps, said subnetworks each being indicated as a pictorial object in an upper display level and a corresponding submap with the network elements contained therein being displayed only on selecting or clicking on such a pictorial element.

A further window shows, for example, in a scrollable list all the alarm notifications received in their temporal sequence. The alarm notifications received can, at the same time, also be filtered in accordance with certain criteria. Thus, for example, it is possible to arrange for alarm notifications to be indicated only from a certain severity level upwards.

To track the alarm states of the network elements, the operator frequently has to switch between the above-described views. To assess the dynamic development of alarm states, i.e. to forecast trends, it is necessary, in addition, to compare current alarm figures with the alarm figures shown earlier.

SUMMARY OF THE INVENTION

The object of the invention is to create a method for the compact display of the state of devices of a network with as comprehensive state information as possible and the means necessary for implementing it.

The basic idea of the invention is to determine from incoming notifications of a network element or a current state for a network element from a population of possible states for the network elements of a network to be monitored, to determine the number of notifications of a network element not cleared at certain time instants and to determine therefrom a current state trend and to display how the network elements or selected network elements as pictorial objects on a display screen, each pictorial object indicating at least the current state determined for the relevant network element and the state trend.

The monitoring of communications networks is always assumed below since the application of the invention is particularly suitable because of the complexity of said networks, i.e. the large number of network elements and the complexity of said network elements. However, the monitoring of other types of networks is also conceivable. Thus, the method according to the invention can also be applied to a railway network comprising points, free-track notification devices and signals as network elements or to a power supply network with cutouts, voltage converters, etc., as network elements.

In view of the great significance of alarm management in communications networks, only alarm notifications and their handling are described below. In the same way, the invention can also be applied to other notifications, for example so-called unsolicited notifications in said networks.

Further advantageous refinements of the invention are to be found in the dependent claims and the description.

BRIEF DESCRIPTION OF THE DRAWINGS

The invention is described further below by reference to the drawing:

FIG. 1 shows a communications network N comprising three interconnected network elements NE1, NE2 and NE3 and a network monitoring device NMC that comprises a processing unit PRU and a display device DIU connected thereto. The network elements NE1, NE2 and NE3 are each connected to the processing unit PRU as shown by broken lines. Said broken lines symbolize a management network or management connections via which alarm notifications and messages of the network elements NE1, NE2 and NE3 are transmitted to the network monitoring device NMC.

Figure 1:
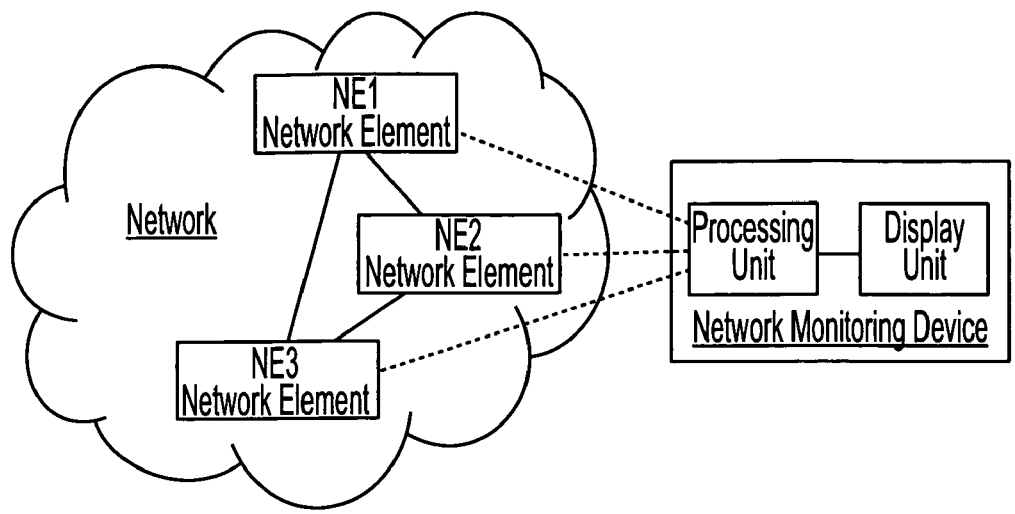
FIG. 1 shows diagrammatically a network to be monitored comprising a monitoring device according to the invention and FIG. 2 shows a portion of a visual display of current states of network elements.

The network elements NE1, NE2 and NE3 are communications nodes of the communications network N, in particular switching centers. In accordance with the prior art, said network elements frequently have a standardized data base which make it possible in the event of fault to send, independently of the producer of the respective network mode or his special configuration, standardized fault notifications by means of a standard protocol to the monitoring device NMC. As an alternative to this, fault notifications are converted into a standard format in an intermediate device (mediator) or in the monitoring device NMC alone.

For this purpose, the abovementioned ITU directive X.733 defines, inter alia, the parameters event time, event type and event information for every alarm notification. The event time is the time the alarm occurs or the time of the alarm generation in the network element. The event type characterizes the alarm that has occurred. This may be, for example, a communications alarm, a quality-of-service, an appliance fault alarm, a processing fault alarm or an environmental alarm. The event information contains a detailed item of predetermined information about the possible cause of the alarm. A call establishment error or a loss of signal may, for example, be notified as possible causes of a communication alarm. The event information also includes an item of urgency information. In this connection, how great the effects are on the respective network element is evaluated. In this evaluation, six possible ratings are defined: "critical", "major", "minor", "warning", "cleared" and "indeterminate".

These ratings can be directly considered as possible states that a network element can assume. In this connection, for example, the state "critical" is assigned to a network element for which an alarm notification of this urgency rating is at least still outstanding. Alternatively, the monitoring device NMC may allocate states deviating from these urgency ratings, for example by combining a plurality of urgency ratings.

In accordance with the prior art, the alarm notifications received by the monitoring device NMC are visualized in varying form and, optionally, by means of hierarchically oriented display levels in each case as a (display screen) window on a display screen of a display unit DIU. As described in the introduction, a window comprising a network map for the purpose of overview is offered in which the individual network elements NE1, NE2 and NE3 of the communications network N to be monitored are displayed as small pictorial objects or so-called "icons". The pictorial objects indicate, for example, a name, a symbol for the type of the respective network element, or a numerical display of alarms received and still pending and may assume a defined alarm color depending on the current urgency, i.e. according to the most urgent alarm still outstanding. The relationships of the network elements among one another are shown by connecting lines. Because of the complex interweaving of the relationships, only a very limited number of network elements can be displayed in one window. In order to be able to display each network element with its relationships if necessary, the network is divided up into a plurality of subnetworks or submaps, said subnetworks each being indicated as a pictorial object in an upper display level and a corresponding submap with the network elements contained therein being shown only on selecting or clicking on such pictorial element. In this connection, the alarm color of a subnetwork indicated as display screen element corresponds to the alarm color of the most urgent of all the alarms outstanding in said subnetwork.

A further window shows, for example in a scrollable list, all the alarm notifications received in their temporal sequence. In this connection, the alarm notifications received can be filtered for display by the operator according to various defined criteria. Thus, for example, it is possible to indicate only alarm notifications from a certain severity level upwards or to indicate certain alarm notifications only if a certain number of similar alarm notifications has been received. Optionally, alarm notifications that have already been cleared, i.e. that have been acknowledged by the operator as cleared or for which it has been established in the relevant network element that the cause of the alarm no longer exists and a corresponding alarm notification is received in the monitoring device NMC can also be suppressed.

For the purpose of forward-looking network management, it is necessary to obtain information about the dynamic development of the states of the network elements NE1, NE2 and NE3. For this purpose, the abovementioned ITU directive X.733 defines a trend indication for the development of the urgency of alarms. However, many network elements are complex devices comprising a plurality of subelements or objects, each of said objects emitting alarm notifications independently. Since the said trend indication is determined in the network element NE1, NE2 or NE3 and is transmitted as a parameter to the network monitoring device NMC, such a trend indication can consequently always relate only to the respective object. For this purpose, the alarms notified in defined consecutive time intervals are considered and the urgency rating is considered in each case of those alarm notifications that had the highest urgency rating in one of the time intervals. The trend indication assumes three possible states: depending on whether the highest notified urgency rating of a current time interval is greater, equal to or less than the highest notified urgency rating of the interval situated temporally in front of it, the trend indication assumes the state "increasing urgency", "no change" or "decreasing urgency", respectively.

Said trend indication has, however, the disadvantage that it contains no information about the trend in the number of outstanding, uncleared alarm notifications and relates only to one object of a network element NE1, NE2 or NE3. Frequently, all the incoming alarm notifications of an object have the same urgency rating. For example, an object of a switching center that is close to its capacity limit increasingly reports alarm notifications because of failed connection attempts. As the loading of the switching center increases, similar notifications arrive at increasingly shorter time intervals. In accordance with the prior art, such alarm notifications initiate a neutral trend indication despite increasing frequency.

According to the invention, a state trend is formed that indicates how the number of uncleared alarm notifications and, consequently, the state of a network element NE1, NE2 or NE3 is developing. As an alternative to this, a state trend may arise only for alarm notifications having certain criteria, for example for uncleared alarm notifications of a certain urgency rating or from a certain urgency rating upwards. An uncleared alarm notification is, in this connection, an alarm notification whose causal alarm basis has not yet been eliminated and, therefore, no clearance notification, i.e. a notification complementary to the alarm notification, has yet been received. The clearance notification may come, in this connection, from the relevant network element NE1, NE2 or NE3 or may take place by an input of the operating personnel in the network monitoring device NMC (not all the network elements can initiate clearance notifications themselves). It is also conceivable that, in the absence of a clearance notification, clearance of an alarm is assumed after a certain time duration.

For this purpose, at certain time instants, preferably at equally long time intervals, alarms received in the network monitoring device and still not cleared are determined. This length of the time intervals may be predefined or can be configured. In the simplest case, the state trend indicates 3 states: increasing number, constant number or decreasing number. Alternatively, the state trend may assume more than three values if, for example, a distinction is furthermore made between slight increase and considerable increase or slight decrease and considerable decrease.

It is also possible to introduce certain threshold conditions for the indication of a trend change. Thus, it may be defined that a trend is designated as neutral provided the basic frequency in the current time interval differs from the corresponding frequency in the last time interval only slightly. This can achieve the result that an operator of the monitoring device (NMC) can concentrate on the essential state changes.

Alternatively, it is possible to determine, for each time interval, the number of alarm notifications received in said time interval or alarm notifications of certain urgency ratings for a network element NE1, NE2 or NE3 and to display the development of this number in a state trend. Such a state trend then indicates the development of the frequency of receipt of alarm notifications.

Figure 2:
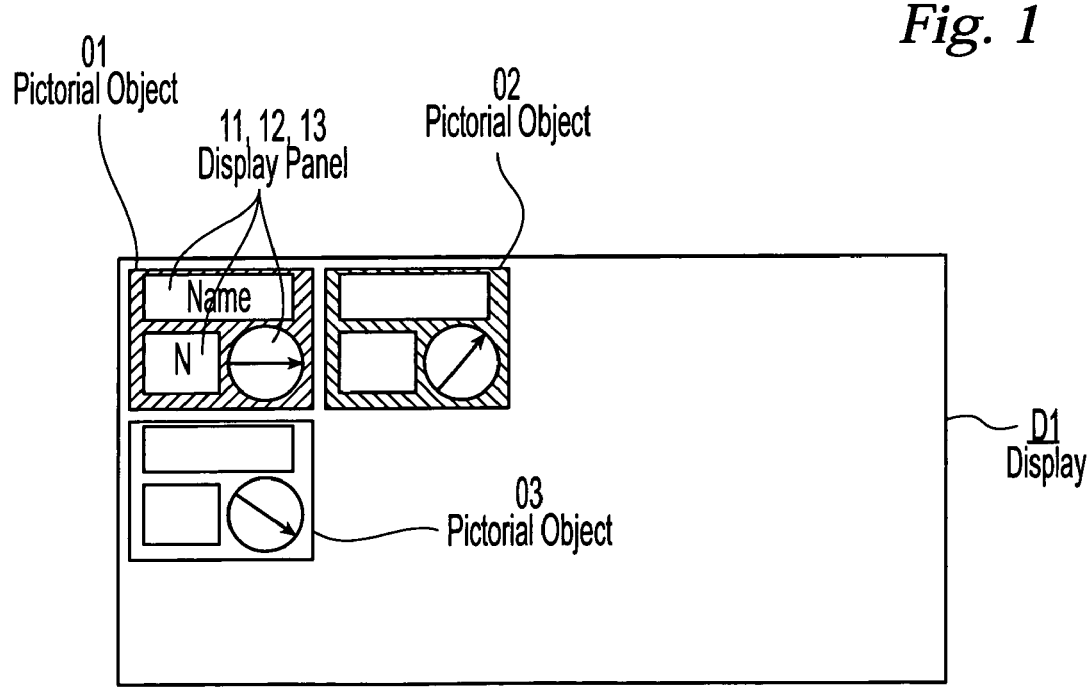

FIG. 2 shows a display screen surface or picture display D1 on a display screen of the display unit DIU of a monitoring device according to the invention comprising, by way of example, three pictorial objects O1, O2, O3 that represent the network elements NE1, NE2 and NE3, respectively, of the communications network N in FIG. 1. The pictorial objects are disposed in the form of a tightly packed matrix. Each pictorial object has, in this connection, a certain color, here symbolized as black, white or black-hatched, and three display panels 11, 12 and 13. The first display panel 11 having the inscription NAME is a name panel for identifying the respective network element. The second display panel 12 having the inscription N is a number panel. In this number panel, the total may be indicated, for example, of all the still current or uncleared critical or urgent alarm notifications of the respective network element. The third display panel shows an arrow in a circle that displays a trend according to alignment. The arrow shown by way of example horizontally in the first pictorial object O1 is a neutral trend for the first network element NE1, the arrow shown by way of example in the second pictorial object O2 from the bottom left to the top right is a positive trend for the second network element NE2 and the arrow shown by way of example in the third pictorial object O3 from the top left to the bottom right is a negative trend.

The different states of the network elements NE1, NE2 and NE3 are assigned a certain color corresponding to their respective alarm state, for example:

green if there are no current alarms, i.e. no alarms or only cleared alarms,
yellow if there are only current warnings and minor alarms,
orange if there is at most current major alarms and
red for current critical alarms.

It has hitherto been assumed that a pictorial object O1, O2 or O3 represents precisely one network element NE1, NE2 or NE3, for example a switching center, a so-called gateway, a so-called router or a services computer. As was mentioned in the introduction, a plurality of network elements, for example the network elements of a regional subnetwork, may also be displayed as a pictorial object. The color of said pictorial object then corresponds to the color of each of its network elements that is in the critical state. The state trend then indicates the trend precisely of the total of alarms and, consequently, the total state of all the network elements affected.

Because of the dense arrangement of network elements NE1, NE2 and NE3 with respective integrated trend state, the method according to the invention makes possible highly compressed and at the some time meaningful information about states and dynamic state development of an extensive network. An operator can consequently largely dispense with other pictorial displays provided he does not discover any striking features developing therein. Only if, for example, a network element in a critical state exhibits, in addition, a positive trend state, does the operator have to change over to receiving detailed information in a view with complete alarm notifications relating to said network element.

If the number of network elements of a communications network K to be monitored is very large, the display can be restricted to network elements selected according to certain criteria. Thus, for example, the fact that only elements are indicated from a certain urgency rating upwards and having neutral or positive state trend may be defined as selection criterion.

In an extension of the invention, when certain notifications or notifications fulfilling defined criteria are fulfilled, a visual display of an indication of the receipt of said notification (for example through flashing of relevant pictorial objects) is initiated automatically or a dialog window or notification window is automatically indicated with an item of relevant information on the display screen (pop-up window).

As an alternative thereto, the content of at least one current notification, in particular the content of the last notification received, of a network element NE1, NE2 or NE3 is indicated on request. Thus, an appropriate dialog window or notification window can be generated and indicated if a pictorial object O1, O2 or O3 is selected (clicked on) by means of a display-screen cursor (display-screen mouse). This item of information can also be indicated in a notification window formed as a speech bubble (a so-called "bubble aid") if the display-screen cursor is moved to a relevant pictorial object.

Whereas the state trend shown in the pictorial objects O1, O2 and O3 is in each case an item of summary trend information for the respective network elements NE1, NE2 and NE3, detailed trend information, for example the number of alarms per severity, the number of new/cleared alarms in the last interval or the state trend per object of a network element can be displayed on the display screen D1 on request. Just as described in the last sections for a (detailed) display of notifications, the request can be made by means of a notification window.

The invention claimed is:

1. A method for displaying of states of network elements of a network to be monitored in a monitoring device, the method comprising:
   evaluating received notifications relating to a network element, and assigning to said network element a current state from a plurality of possible states based on a result of the evaluating of the received notifications;
   determining a number of uncleared notifications of the network element, and determining a current state trend of the uncleared notifications; and
   displaying pictorial objects corresponding to the network elements on a display screen of the monitoring device, wherein each pictorial object displays at least the current state trend of the corresponding network element.

2. The method according to claim 1, further comprising, on receipt of certain notifications or of notifications that satisfy defined criteria, automatically displaying an indication of the receipt of said notification or of an item of information corresponding to said notification on the display screen.

3. The method according to claim 1, further comprising displaying the content of at least a last notification received from a network element in a dialog window on the display screen if the relevant network element is selected by means of a display-screen cursor.

4. The method according to claim 1, further comprising displaying detailed trend information in a dialog window on the display screen if the relevant network element is selected by means of a display-screen cursor.

5. The method according to claim 1, wherein the determining the number of uncleared notifications comprises determining a number of uncleared notifications satisfying a predetermined criteria at predetermined time intervals.

6. A monitoring device for monitoring a network comprising the following means:
   receiving means for receiving notifications from network elements or for network elements of the network to be monitored,
   allocation means for allocating a respective current state from a plurality of possible states for individual network elements,
   determining means for determining a number of uncleared notifications from a network element,
   calculating means for determining a current state trend from the numbers determined and
   display means for displaying pictorial objects corresponding to the network elements on a display screen, wherein each pictorial object displays at least the current state trend of the corresponding network element.

7. The monitoring device according to claim 6, wherein the determining means determines a number of uncleared notifications satisfying a predetermined criteria at predetermined time intervals.

* * * * *